US000001202H

United States Statutory Invention Registration [19]

[11] Reg. Number: H1202

Manner

[43] Published: Jul. 6, 1993

[54] TOOL FOR TURNING LARGE DIAMETER OBJECTS ON PETROLEUM COKERS

[76] Inventor: Joe Manner, 8444 Kickerville Rd., Blaine, Wash. 98230

[21] Appl. No.: 810,596

[22] Filed: Dec. 19, 1991

[51] Int. Cl.[5] ..... B25B 13/50; B25B 17/00

[52] U.S. Cl. ..... 81/57.34; 81/57.39

[58] Field of Search ..... 81/54, 57.33, 57.34, 81/57.39, 57.44, 176.2

[56] References Cited

U.S. PATENT DOCUMENTS

| | | | |
|---|---|---|---|
| 2,495,475 | 1/1950 | Phillips | 81/57.44 X |
| 2,536,172 | 1/1951 | Halperin | 81/176.2 X |
| 3,955,447 | 5/1976 | Parker | 81/57.39 |
| 4,309,923 | 1/1982 | Wilmeth | 81/57.39 |
| 5,070,749 | 12/1991 | Haviv | 81/57.39 X |

*Primary Examiner*—David H. Brown

[57] ABSTRACT

Apparatus and methods for turning large diameter circular members in limited areas. A circular member having holes capable of receiving a pin is fitted with a semi-circular collar having an inwardly facing pin and outwardly facing ratchet holes capable of receiving a hydraulic ram pin along its outer radius. A jack having a hydraulic ram end on one end and a fixed rotating point at the other is used to apply a tangential force to the circular member so as to rotate the circular member.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TOOL FOR TURNING LARGE DIAMETER OBJECTS ON PETROLEUM COKERS

BACKGROUND OF THE INVENTION

1. Field of the Invention

This invention relates to a tool for turning large diameter objects in limited work areas and more particularly relates to the turning of a large nut used on petroleum coking equipment.

2. Description of the Prior Art

Delayed coking is a well-known process. Typically, each coker comprises a vertically-oriented cylindrical drum. The drum has a top head and a bottom head covering and sealing the top and bottom, respectively, of the drum. The drum is a massive vessel, typically about twenty-six feet in diameter and about eighty-six feet tall. The top head and the bottom head also are massive devices, being about six feet in diameter and each weighing approximately two and one-half tons.

Heavy liquid hydrocarbon feed to the coker typically is preheated in a heater to a temperature in the range of about 700° to 900° F. The feedstream is thermally cracked in the coke drum for an extended period of time during the coking cycle to produce gas and gas oil and other hydrocarbon product streams of various boiling ranges and to form porous carbonaceous petroleum coke. The gas and normally liquid product streams are removed as vapors during the coking cycle from the top of the drum, and the coke remains in the drum at the end of the coking cycle. The hydrocarbon feed is switched from the coke drum to a second parallel coke drum while the first drum is taken off-line, and coke is removed from the first drum.

Hydrocarbon feed to each coker is typically fed to the on-line coke drum through an inlet port which is typically incorporated into the drum bottom head, and product vapor streams exit the vessel through process an outlet port, which is typically incorporated in the top head.

The coke is then cleaned using steam to remove any entrained hydrocarbons and is cooled with water. To remove the coke from the off-line drum, the top and bottom heads of the drum must be removed. After both the top and bottom heads and the chute cover are removed, the coke in the drum is cut by a hydraulic water jets using, for example, a 3000 psi water rotating water drill. First, a vertical pilot hole is drilled through the core of the coke to provide a channel for coke discharge through the bottom opening of the coke drum. Then, the water drill is directed against the upper surface of the coke at a distance from the central discharge core and cuts the coke into pieces, which pieces fall out of the drum, and through the pilot hole. The water drill jet is moved in both a circular and vertical pattern until all of the coke is cut and falls from the drum into a discharge chute and then on to coke storage.

In order to change from the coking where hydrocarbons exit the top of the coker drum, to the drilling mode where the drill stem is positioned over the top of the coker drum, a coker drill stem must be swung to the top of the coker. A gearbox is used to swing the coker drill stem. The gearbox swivel assembly has a large nut, approximately eleven inches in diameter having several holes in its outer diameter capable of receiving a pin. The maintenance and repair requirements for the gearbox swivel assembly require the removal and replacement of the nut. The nut is located a limited area between several upright members on the assembly.

In the past, this large nut has required two people using a large spanner wrench and a mallet to apply the necessary torque. The spanner was fit around the nut and its pin fit into one of the holes on the nut. The first person held the spanner while the second pounded the spanner with a mallet. This method is labor intensive, time consuming and difficult in the limited area available because the wrench must be moved to several times around the circumference of the nut to turn it. In addition, it required two people and its physical location made it difficult to work on safely. There is a need for a simple and effective means for one person to safely apply the torque needed to turn this large nut in the limited area available.

SUMMARY OF THE INVENTION

In accordance with this invention, a new apparatus for turning a large nut in a limited space is provided. This apparatus comprises:

An apparatus for applying a tangential force to a large, substantially circular member capable of receiving a pin at a plurality of locations on its outer diameter, comprising:

(a) a semicircular collar having an inner radius;

(b) a pin attached to the inner radius of the collar capable of mating with said circular member for transferring the tangential force to the circular member; and (c) a notched outer radius for transmitting the tangential force to the semicircular collar; whereby the tangential force necessary to turn the member can be applied in a limited area. By use of the apparatus and method of this invention, the large nut can be simple and effectively turned in the limited area available.

BRIEF DESCRIPTIONS OF DRAWINGS

DESCRIPTION OF PREFERRED EMBODIMENTS

Figure 1:
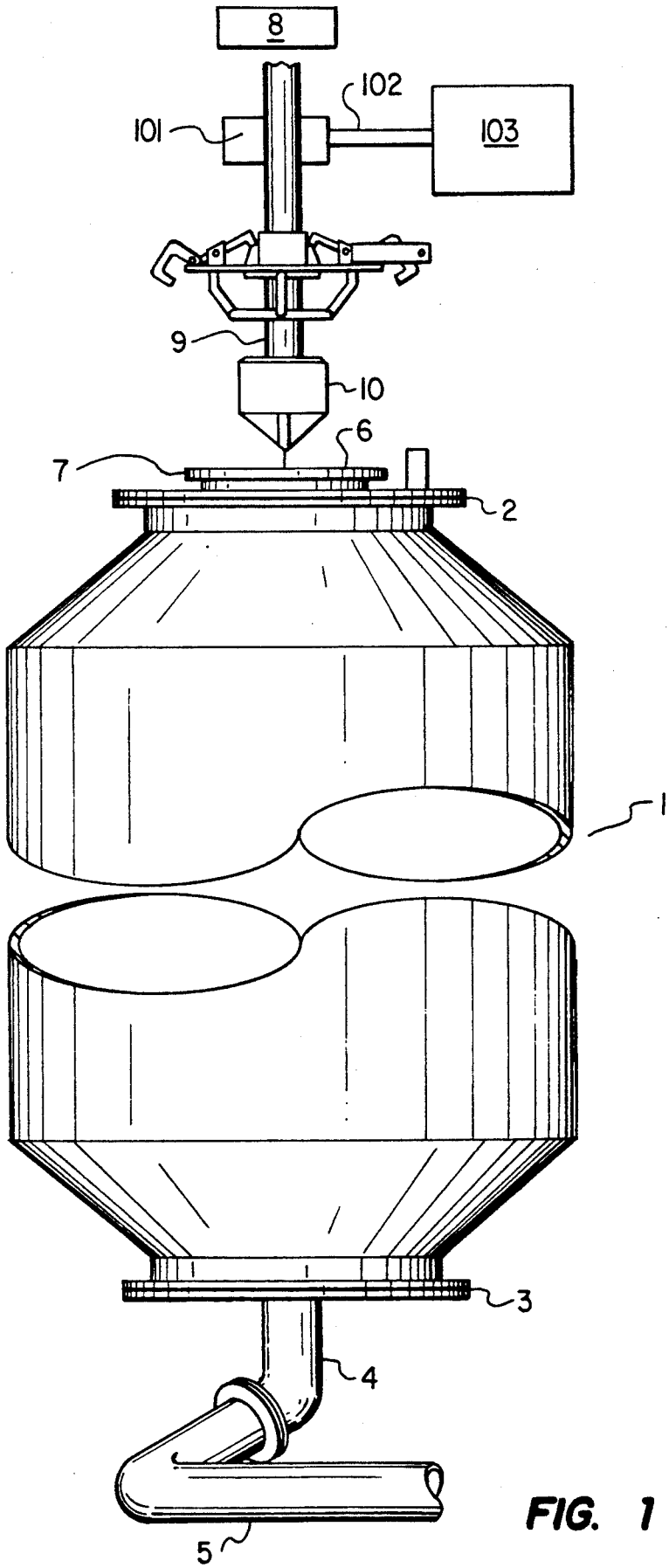
FIG. 1 illustrates a schematic for a typical petroleum coking drum.

The invention is illustrated with reference to the drawings wherein, for purposes of illustration, it being understood that this invention is not limited thereto. The drawing figures are not necessarily to scale and certain elements are shown in generalized or somewhat schematic form in the interest of clarity and conciseness The same number is used in each drawing to identify the same or similar components.

FIG. 1 illustrates a schematic for a typical petroleum coking drum. Referring now to FIG. 1, coking drum 1 is illustrated with an upper lid 2, a lower lid 3, a feed inlet 4 for introduction of crude and a feed line 5. An aperture 6 with an end flange 7 is provided in the upper lid. A fluid source 8 is provided at one end of drill stem 9; a cutting tool 10 is provided at a second, opposite end of the drillstem 9. Gearbox 101 is positioned on drillstem 9 between cutting tool 10 and fluid source 8. Gearbox 101 is attached to gearbox swivel assembly 103 through structural member 102.

Figure 2:
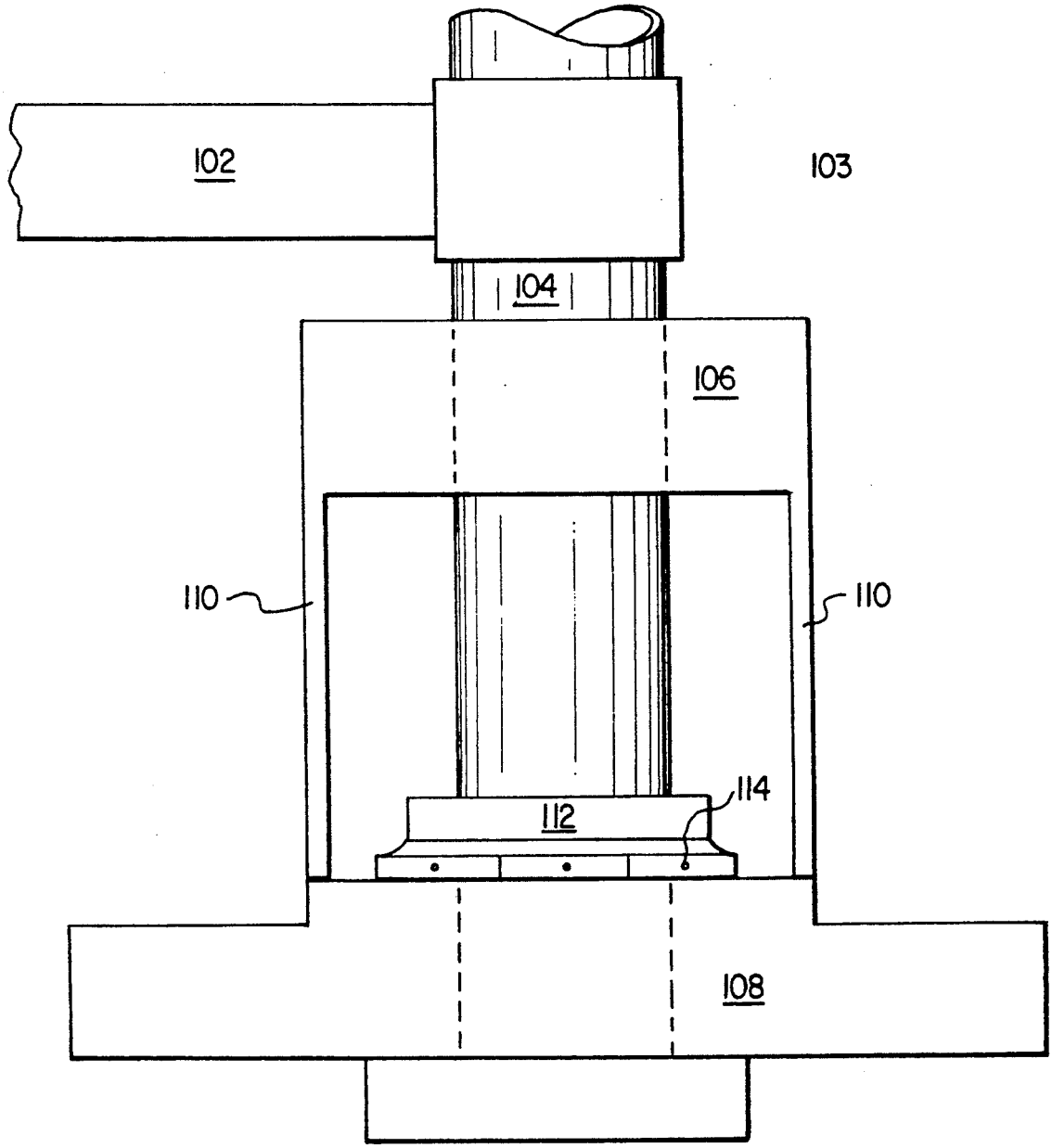
FIG. 2 illustrates in more detail the gearbox swivel assembly for the coker drill stem.

FIG. 2 illustrates in more detail gearbox swivel assembly 103. As was mentioned above, structural member 102 is affixed to gearbox swivel assembly 103 on shaft 104. Shaft 104 fits slidably through top 106 of assembly 103. Top 106 is positioned above base 108 by several upright members 110 and provides lateral support for shaft 104. For clarity only two upright members are shown but three or more members may be employed to support top 106 and stabilize shaft 104. Shaft 104 fits slidably into base 108 which provides the motive force (not shown) for turning shaft 104 and thereby turning drillstem 9 and gearbox 101 through structural member 102. Nut 112 is threaded on shaft 104. Nut 112 is large in diameter, for example, eleven inches, and has six evenly spaced holes 114 around its circumference. Holes 114 are designed to be capable of receiving a pin from a tool for loosening or tightening of nut 112.

Figure 3:
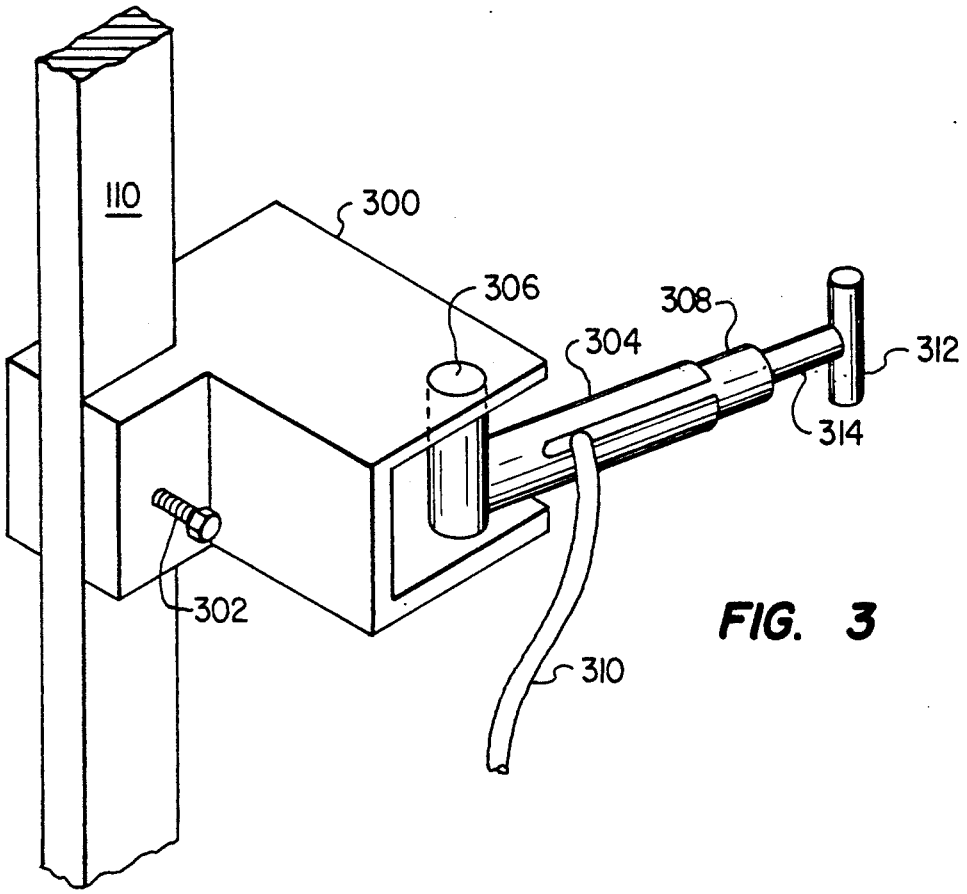
FIG. 3 illustrates a stationary portion for one embodiment of the present invention.

FIG. 3 illustrates a stationary portion for one embodiment of the present invention. Fixture 300 is fitted around upright 110 and held at the appropriate vertical position by tightening bolt 302 against upright 110. Hydraulic ram holder 304 is rotatably attached to fixture 300 through pivot pin 306 which is threaded into fixture 300. Pin 306 is, for example, a cylinder approximately 4 inches in length and 1.25 inches in diameter formed from any suitable material including but not limited to a B-17 steel. Hydraulic ram holder 304, while unable to move along its axis, is free to rotate about pivot pin 306. Hydraulic ram holder 304 is capable of receiving hydraulic jack 308 which can be any one of a number of hydraulic jacks well known in the art and including, but not limited to, a porta-power hydraulic jack. Hydraulic pressure is supplied via supply line 310 so as to move hydraulic ram pin 312 along the axis of jack 308 as is well known in the art. Hydraulic ram pin 312 is connected to ram 314 of hydraulic jack 308 and can be, for example, a cylinder approximately 2.5 inches in length and 1 inch in diameter suitably connected to ram 314 through, for example, a threaded connection. Hydraulic ram pin 312 may be fabricated out of any suitable material, including, for example, B7 steel.

Figure 4:
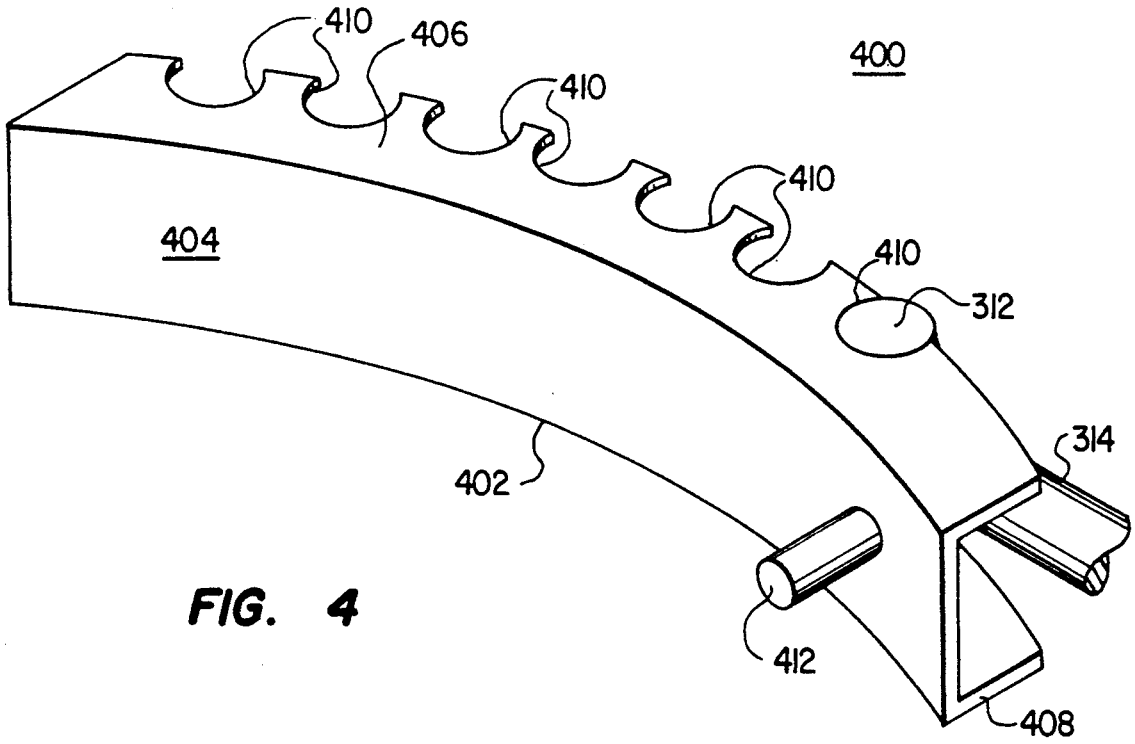
FIG. 4 illustrates a movable semicircular collar for use with one embodiment of the present invention.

FIG. 4 illustrates a semi-circular collar for use with one embodiment of the present invention. Semi-circular collar 400 is an arc whose inner radius 402 is substantially the same as the outer radius of nut 112. Collar 400 can be fabricated any suitable material, for example, half inch flat bar steel. Semi-circular collar 404 includes a top 406, a middle, 404, and bottom, 408. Top 406 and bottom 408 are attached to middle section 404 perpendicular to its face. Semi-circular collar 400 may, for example, form an arc of approximately 150°. Top 406 and bottom 408 include a number of ratcheted cutouts 410 suitable for allowing the transmission of the linear motion of hydraulic ram pin 312 and ram 314 to collar 400. The height of middle 404 and spacing between top 406 and 408 is larger than the diameter of ram 314 so as to allow ram 314 to be positioned between tops 406 and bottom 408, if necessary. Ratchet holes 410 can be positioned, for example, 20° apart along the outer radius of semicircular collar 400. Pin 412 extends inwardly and is perpendicular to the face of middle 404 and is suitably attached thereto. Attachment to middle 404 can be accomplished using any one of a number of methods well known in the art, including a threaded connection. In addition, if necessary, additional structural support, not shown, can be provided to semi-circular collar 400 in the vicinity of pin 412.

In operation, fixture 300 is mounted firmly on one of the uprights 110 on swivel assembly 103. Bolt 302 fixes the vertical location of the vertical location of fixture 300. Hydraulic jack 308 is then slid into holder 304. Semi-circular collar 400 is fitted on nut 112, and pin 412 is firmly seated in one of the six holes 114. Hydraulic ram pin 312 is then placed into a ratchet hole 410.

The operator then increases the pressure provided to hydraulic jack 308 through hydraulic line 310 and ram 314 begins to move outwardly from hydraulic jack 308. The linear motion of ram 314 and ram pin 312 applies a tangential force to semi-circular collar 400 through ratchet hold 410. This tangential force is transmitted from semi-circular collar 400 through pin 412 to hole 114 thereby causing nut 112 to rotate.

During this operation, semi-circular collar 400 will begin rotation and, thus, hydraulic jack 308 must be free to rotate as necessary to continue to apply the force to semi-circular collar 400. In order to accomplish this, holder 304 rotates about pivot pin 306 thereby allowing the continued application of force to semi-circular collar 400 as it begins to rotate.

If necessary, when ram 314 is fully extended, for example, collar 400 can be repositioned using a second hole 114 on the outer radius of not 112 and the procedure can be repeated as necessary until nut 112 is removed.

This same procedure can be used to tighten nut 112 by using the appropriate positioning of fixture 300 and semi-circular collar 400.

While this invention has been described for use with a coker drum, it will be obvious to those skilled in the art that the apparatus and method described herein may be applied generally, and in particular to many other situations where large diameter circular members must be turned in limited areas.

Having thus described the invention by reference to certain of its preferred embodiments, it is respectfully pointed out that the embodiments described are illustrative rather than limiting and that many variations and modifications are possible within the scope of the present invention. Many such variations and modifications may appear obvious and desirable to those skilled in the art based upon the foregoing description of the preferred embodiment.

Having thus described the invention, we claim:

1. An apparatus for applying a tangential force to a large, nut having a substantially circular periphery on a petroleum coking unit circular member which nut is adjacent and in close proximity to an upright member of the coking unit of an assembly for holding the circular member and which nut is capable of receiving a pin at a plurality of locations on its periphery, comprising:

(a) a removable semicircular collar having an inner radius substantially the same as the periphery of the nut capable of fitting between said upright member and the nut;

(b) a pin attached normal to the inner radius of the collar capable of mating with the outer radius of the nut for supporting said semicircular collar on said nut and for transferring the tangential force to the nut;

(c) a jack having a fixed and a movable end along one axis capable of producing the tangential force;

(d) a notched outer radius on said semiconductor collar for transmitting a tangential force to the semiconductor collar capable of engaging the movable end of the jack for applying the tangential force to the nut;

(e) a fixture capable of receiving the fixed end of the jack removably attached to said upright member for holding the circular member thereby prohibiting motion along the axis of the jack during the application of the tangential force to the semicircular collar;

whereby the tangential force necessary to turn the nut can be applied in a limited area.

2. The apparatus of claim 1, wherein the jack is a portable hydraulic jack.

* * * * *